United States Patent
Lieggi

(10) Patent No.: US 7,270,748 B1
(45) Date of Patent: Sep. 18, 2007

(54) STERILIZING WATER FAUCET

(75) Inventor: Damien Lieggi, Youngstown, OH (US)

(73) Assignee: Next Energy Wave, Inc., Youngstown, OH (US)

( * ) Notice: Subject to any disclaimer, the term of this patent is extended or adjusted under 35 U.S.C. 154(b) by 299 days.

(21) Appl. No.: 10/945,034

(22) Filed: Sep. 21, 2004

(51) Int. Cl.
*C02F 1/32* (2006.01)

(52) U.S. Cl. .................... 210/198.1; 210/418; 250/435

(58) Field of Classification Search ................ 210/192, 210/748, 198.1, 418; 250/435; 422/24
See application file for complete search history.

(56) References Cited

U.S. PATENT DOCUMENTS

| | | | |
|---|---|---|---|
| 4,017,734 A | | 4/1977 | Ross |
| 4,520,516 A | * | 6/1985 | Parsons .......................... 4/623 |
| 4,676,896 A | * | 6/1987 | Norton ........................ 210/192 |
| 4,899,057 A | * | 2/1990 | Koji ............................ 250/436 |
| 5,505,912 A | | 4/1996 | Hallett |
| 5,626,768 A | | 5/1997 | Ressler et al. |
| 6,521,194 B2 | | 2/2003 | Yeh |
| 6,570,173 B1 | | 5/2003 | Kunkel et al. |
| 6,927,501 B2 | * | 8/2005 | Baarman et al. .............. 290/43 |
| 2005/0000913 A1 | * | 1/2005 | Betterly ...................... 210/748 |

* cited by examiner

*Primary Examiner*—Matthew O. Savage
(74) *Attorney, Agent, or Firm*—Harpman & Harpman

(57) ABSTRACT

An integrated flow through water sterilization device within a sanitary faucet fixture. A portion of the flow path has a plurality of ultraviolet radiation generating LED's arranged around a transparent flow conduit within the faucet. The ultraviolet radiation generating LED's effectively sterilize the water as it flows through and is dispensed by the faucet. A hydro-electric generator is driven by a water flow to the faucet upon demand and provides electrical power for the ultraviolet radiation generating LED's as water is used.

4 Claims, 4 Drawing Sheets

STERILIZING WATER FAUCET

BACKGROUND OF THE INVENTION

1. Technical Field

This invention is directed to the sterilization of potable water at the dispensing outlet. More specifically, the use of ultraviolet radiation lamps to affect a sterilization of drinking water by exposing the water stream to UV radiation using a germicidal UV light source.

2. Description of Prior Art

Prior art devices of this type can be seen, for example, in U.S. Pat. Nos. 4,017,734, 5,626,768, 6,570,173 and 6,521,192.

Most prior art patents are directed to remote ultraviolet lamp systems that use a traditional ultraviolet lamp directing the ultraviolet radiation to a housing or jacket about the lamp through which water flows.

In U.S. Pat. No. 6,570,731 a protective sleeve about a UV lamp is shown. Also see U.S. Pat. No. 5,505,192 in which a lamp cooling for a UV lamp reactor assembly is disclosed for treating a fluid medium where the lamp is operable at high temperatures in excess of 300 degrees centigrade.

Other patents for water purification use similar UV lamp configurations for treating water, see U.S. Pat. Nos. 4,017,734, 5,626,768.

In U.S. Pat. No. 6,521,194 an ozone generating faucet is disclosed that uses a faucet mounted ozone generator to produce ozone which is then infused into the water stream as it passes through the faucet thereby sterilizing the water using the sterilizing properties of ozone.

SUMMARY OF THE INVENTION

A water sterilization faucet providing a self-contained source of electrical energy to energize low voltage ultraviolet light assemblies surrounding a transparent water flow conduit of the faucet. The UV light assembly utilizes highly efficient UV LED's as a light source which have low energy demands due to their high efficiency in converting electrical energy into effective sterilizing UV radiation. A pair of miniature hydro-electric generators are driven by the actual flow demand of the faucet energizing the LED assemblies and sterilizing the water as it passes therethrough.

DESCRIPTION OF THE PREFERRED EMBODIMENT

Figure 1:
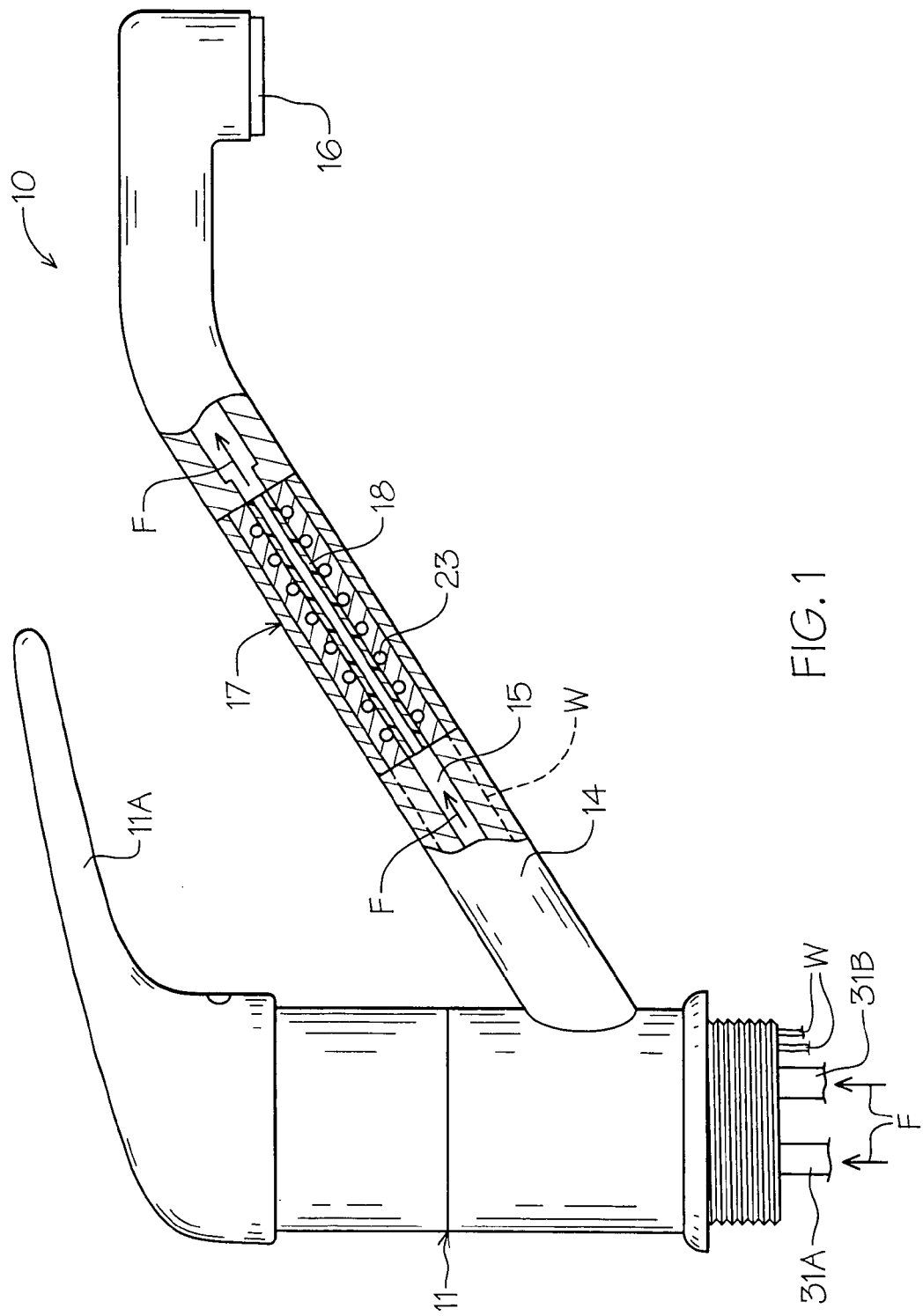
FIG. 1 is a side elevational view with a portion cut away of the purification faucet.
Figure 2:
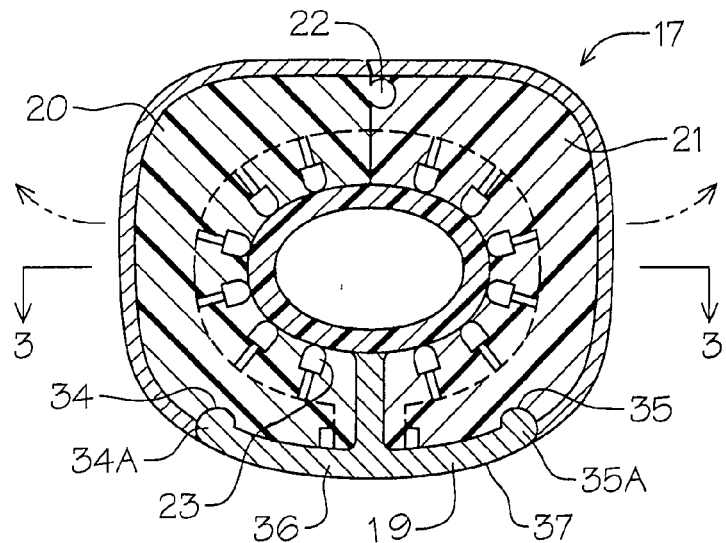
FIG. 2 is an enlarged partial sectional view of the LED UV light conductive assembly removably secured within the spout of the faucet.
Figure 3:
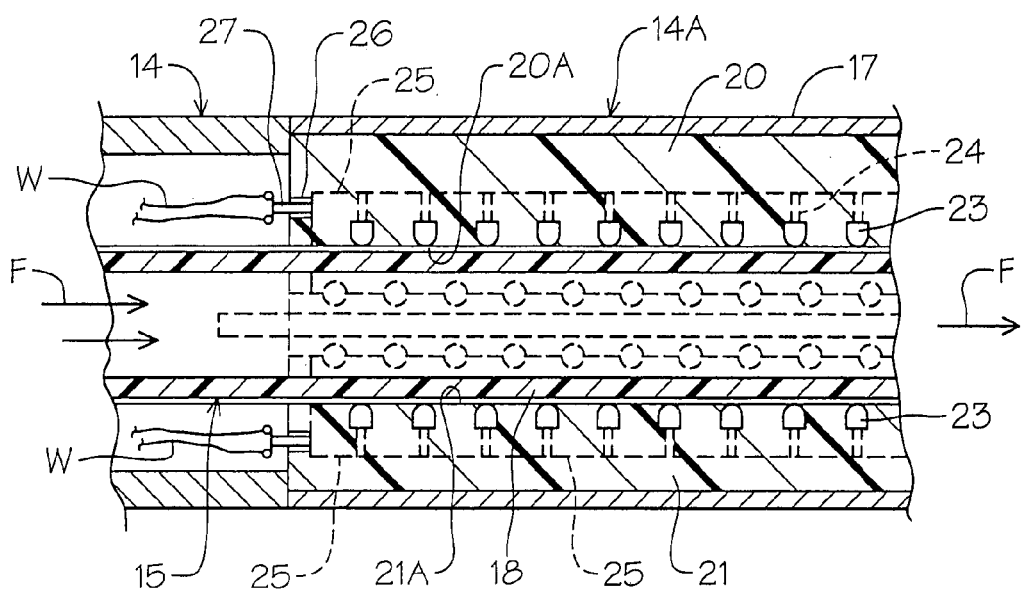
FIG. 3 is an enlarged section on lines 3-3 of FIG. 2.

Referring to FIGS. 1-3 of the drawings, a water purification faucet 10 of the invention can be seen having a control mixture valve assembly 11 with a pair of water supply inlet lines 12 and 13 as is well known and understood within the art. A dispensing spout 14 extends from the control mixing valve assembly 11 having a fluid conduit 15 formed within with an outlet nozzle at 16.

A sterilization module 17 of the invention can be seen forming a mid-section 14A of the spout 14 engaged about a portion 18 of the fluid conduit 15. The conduit portion 18 is transparent to provide maximum exposure to the sterilization module 17 which is removably secured thereon.

In this example, the fluid conduit portion 18 is made from synthetic resin material and is supported by the base portion 19 of the spout 14. It will be evident that other conduits and spout configurations can be used so long as a portion of the conduit is transparent, as noted above.

The sterilization module 17 of the invention is preferably formed of a pair of half-arcuate elongated elements 20 and 21 hinged together by a longitudinal hinge 22 formed there within. Each of the elements 20 and 21 is formed from a molded section of synthetic resin material with a plurality of ultraviolet emitting low voltage LED's 23 mounted within so as to be exposed over an inner effacing surfaces 20A and 21A of the respective elements.

Each of the UV emitting LED's 23 generate ultraviolet radiation in a wave length of approximately 253.7 nanometers which is established to have an excellent germicidal effect.

Figure 4:
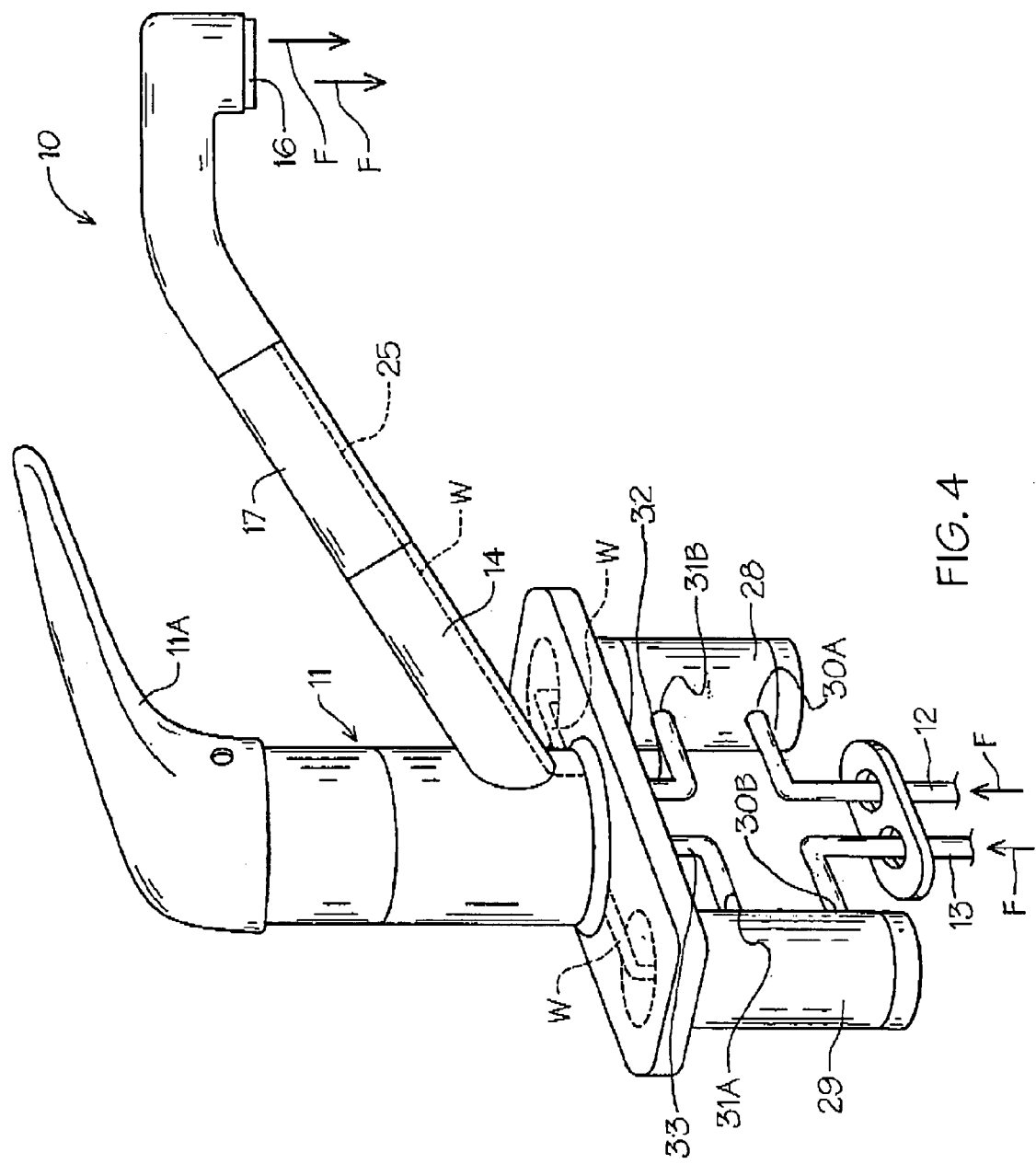
FIG. 4 is a perspective view of the water purification faucet illustrating multiple hydro-electric generators therewith.

The UV LED's 23 are in evenly spaced longitudinal and transverse relation to one another embedded within the inner surfaces 20A and 21A of the respective elements 20 and 21 with the respective power lead wires W electrically interconnected to electrical supply wire net 25 (shown in broken lines) which in turn has pairs of registerable interconnected conductors 26. Corresponding electrical receptacle fittings 27 extend from the spout 14 with lead wires W extending therefrom to a pair of electrically interconnected hydroelectric generators 28 and 29 below the faucet assembly as best seen in FIG. 4 of the drawings.

The hydro-generators 28 and 29 have respected inflow and outflow ports 30A, 30B, 31A and 31B for receiving faucets hot and cold water supply lines 12 and 13 and inlet supply water lines 32 and 33 therein a will be well understood by those skilled in the art.

Referring now back to FIGS. 2 and 3 of the drawings, the sterilization module 17 of the invention can be seen wherein the arcuate elements 20 and 21 have interengagement areas at 34 and 35 formed therein which frictionally engage with corresponding registration ridges 34A and 35A extending from the respective extensions 36 and 37 of the base 19 of the spout 14.

In operation, the sterilization module 17 is hinged open longitudinally and engaged over the conduit portion 18 of the faucet and resiliently locked thereon by the hereinbefore described inner engagement areas 34 and 35. Again it will be evident that other inner engagement and interlocking configurations can be used to join the respective arcuate elements 20 and 21 together onto the spout 14 around the transparent portion 18 of the fluid conduit 15 as hereinbefore described.

The positioning and registration of the sterilization module 17 engages the respective electrical interconnects 26 and receptacle fittings 27 to provide electrical power for the embedded ultraviolet radiation emitting LED's 23.

In operation, upon water demand when the valve assembly 11 is open by handle 11A, either individual hydro-electric generator 29 or 30 or both are activated depending on the water demand imparted by the valve assembly 11 and will begin generating a positive electrical energy for the interconnected ultraviolet radiation emitting LED's 23 within the sterilization module 17 which will radiate the water flow F as it passes through the transparent conduit portion 18 of the fluid conduit 15.

It will be evident that the low power requirement of the ultraviolet radiation emitting LED's 23 can easily be provided for by the hydro-electric generators 28 and 29 with any usable fluid flow rate and incremental duration achieved by the typical water use within reasonable parameters.

It will also be noted that the number of ultraviolet radiation emitting LED's 23 will be proportionate to the length of the sterilization module 17 and the diameter of the water conduit portion 18 extending therethrough.

Figure 5:
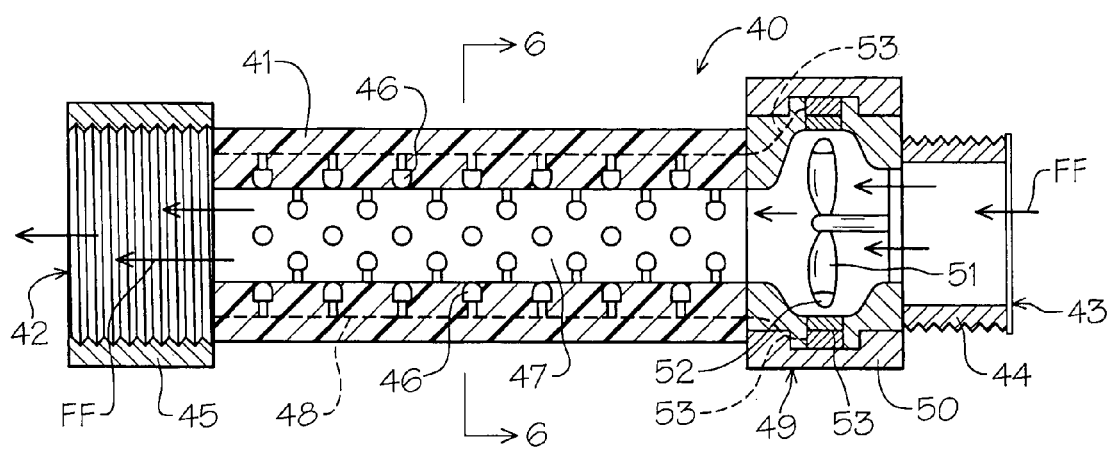
FIG. 5 is an enlarged perspective view of an alternate form of the invention for field use to sterilize a supply of water through a hose or other piping orientation.
Figure 6:
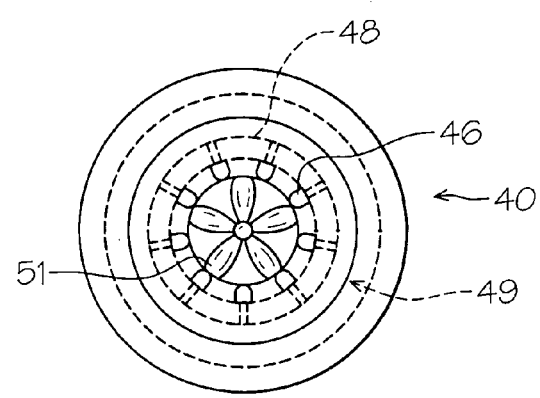
FIG. 6 is an enlarged cross-sectional view on lines 6-6 of FIG. 5.

Referring now to FIGS. 5 and 6 of the drawings, an alternate form of the invention can be seen as a portable (field) sterilization device 40 for use in remote locations or as a temporary water treatment device. The sterilization device 40 has a central cylindrical body member 41 with oppositely disposed ends 42 and 43. Respective threaded engagement male and female fittings 44 and 45 extend therefrom for interconnecting to corresponding hose fittings (not shown) or other potable and or temporary water treatment venues as required. The central cylindrical body member 41 has a plurality of ultraviolet radiation emitting LED's 46 in longitudinal and annular spaced relation to one another embedded within positioned about a tubular passageway 47 formed thereby. The ultraviolet radiation emitting LED's 46 are electrically interconnected to a self-contained source of electrical power via a wire harness 48 shown in broken lines within the central cylinder body member 41. The self-contained power source for the ultraviolet radiation emitting LED's 46 is an electrical generator assembly 49 integrated between the cylindrical body member 41 and the threaded end fitting 44. The electrical generator 49, best seen in FIG. 5 of the drawings, has an annular housing 50 with a multiple veined impellor 51 rotatably positioned within. In this example, the ends of the impellor 51 have magnetic tips at 52 with electro-magnetic generation coil 53 within the housing 50 thereabout which will induce electrical output to interconnected output wires 53 as the multi-veined impellor 51 spins. Alternately, a commercially available miniature hydro-electric generator can be used as is well known and understood within the art that will utilize a fluid flow indicated by the directional flow arrows FF across the impeller or conductive turbines (not shown) supplying power to the hereinbefore described sterilization system.

In operation, as the water flow FF passes through the electric generation assembly 49, power is supplied to multiple ultraviolet radiation emitting LED's 46 lining the cylindrical body member 41 around the tubular passageway 47 formed within so as water flow FF proceeds therethrough it is effectively sterilized by the ultraviolet radiation emitting LED's.

It will thus be seen that a new and novel sterilization system for a self-contained domestic water supply faucet and portable field operable water system has been illustrated and described and that it will be apparent to those skilled in the art that various changes and modifications may be made therein without departing from the spirit of the invention.

I claim:

1. A water purification system for a faucet utilizing ultraviolet radiation comprises,
    an elongated cylindrical body member having an inlet and an outlet,
    a plurality of ultraviolet radiation generating LED's positioned within said body member surrounding a passageway formed thereby,
    said cylindrical body member removably secured around a fluid passage in said faucet,
    said cylindrical body member forms a pair of elongated half-arcuate elements hinged longitudinally to one another,
    means for electrically interconnecting said ultraviolet radiation generating LED's to a source of electrical power.

2. The water purification system for a faucet set forth in claim 1 wherein said means for electrically connecting said ultraviolet radiation generating LED's to one another comprises,
    electrical transmission circuit within said cylindrical body member and interconnecting electrical receptacle fittings.

3. The water purification system for a faucet set forth in claim 1 wherein said pair of hinged arcuate elements are made of synthetic resin material.

4. The water purification system for a faucet set forth in claim 1 wherein said fluid passageway comprises,
    a transparent conduit portion within said passageway formed by said elongated cylindrical body member.

* * * * *